US011873842B2

(12) United States Patent
Seo et al.

(10) Patent No.: US 11,873,842 B2
(45) Date of Patent: Jan. 16, 2024

(54) AIR CLEANER

(71) Applicant: MIRO CO., LTD., Incheon (KR)

(72) Inventors: Dong Jin Seo, Incheon (KR); Yong Ju Oh, Incheon (KR); Min Seok Kim, Incheon (KR); Jeong Won Lee, Incheon (KR)

(73) Assignee: MIRO CO., LTD., Incheon (KR)

( * ) Notice: Subject to any disclaimer, the term of this patent is extended or adjusted under 35 U.S.C. 154(b) by 380 days.

(21) Appl. No.: 17/268,821

(22) PCT Filed: Aug. 19, 2020

(86) PCT No.: PCT/KR2020/011027
§ 371 (c)(1),
(2) Date: Feb. 16, 2021

(87) PCT Pub. No.: WO2021/145528
PCT Pub. Date: Jul. 22, 2021

(65) Prior Publication Data

US 2022/0136529 A1 May 5, 2022

(30) Foreign Application Priority Data

Jan. 17, 2020 (KR) ........................ 10-2020-0006804
Jun. 11, 2020 (KR) ........................ 10-2020-0070934

(51) Int. Cl.
*F04D 29/70* (2006.01)
*F04D 25/08* (2006.01)
(Continued)

(52) U.S. Cl.
CPC ........... *F04D 29/706* (2013.01); *F04D 25/08* (2013.01); *F04D 29/4253* (2013.01);
(Continued)

(58) Field of Classification Search
CPC ....................... F04D 29/4253; F05D 2260/607
See application file for complete search history.

(56) References Cited

U.S. PATENT DOCUMENTS 10,330,104 B2 6/2019 Son et al.
10,518,205 B2 * 12/2019 Mun ........................ F24F 13/20
(Continued)

FOREIGN PATENT DOCUMENTS

CH 460716 A 8/1968
CN 108061342 A 5/2018
(Continued)

*Primary Examiner* — Long T Tran
(74) *Attorney, Agent, or Firm* — Bridgeway IP Law Group, PLLC; Sang Ho Lee; Hyun Woo Shin

(57) ABSTRACT

The present invention relates to an air cleaner, including a body forming an exterior; a suction portion formed on the body to suck air; a discharge portion formed on the body and discharging the air sucked through the suction portion; and a fan module provided in the body to form a flow of air flowing from the suction portion to the discharge portion, wherein the fan module includes: a driving portion forming a rotation shaft and generating power; a fan receiving the power from the driving portion and rotating about the rotation shaft; and a shroud accommodating the fan and provided between the suction portion and the discharge portion to guide the air sucked through the suction portion to the discharge portion, and the shroud includes a guide portion guiding foreign substances introduced through the discharge portion in a direction opposite to the flow of air.

10 Claims, 4 Drawing Sheets

(51) Int. Cl.

| | |
|---|---|
| ***F04D 29/42*** | (2006.01) |
| ***F24F 3/16*** | (2021.01) |
| ***F24F 13/08*** | (2006.01) |
| ***F24F 13/20*** | (2006.01) |
| ***F24F 13/28*** | (2006.01) |

(52) U.S. Cl.

CPC .............. *F04D 29/703* (2013.01); *F24F 3/16* (2013.01); *F24F 13/081* (2013.01); *F24F 13/20* (2013.01); *F24F 13/28* (2013.01); *F05D 2260/607* (2013.01)

(56) References Cited

U.S. PATENT DOCUMENTS

| | | | | |
|---|---|---|---|---|
| 2006/0277875 | A1* | 12/2006 | Schuld | B01D 46/521 55/484 |
| 2010/0263827 | A1* | 10/2010 | Sakashita | F24F 8/108 165/104.34 |
| 2015/0004064 | A1* | 1/2015 | Lee | B01D 46/0028 165/59 |
| 2015/0273378 | A1* | 10/2015 | Sohn | B01D 46/0038 55/357 |
| 2016/0114278 | A1* | 4/2016 | Yu | B01D 46/0039 55/473 |
| 2018/0147523 | A1 | 5/2018 | Oh | |
| 2019/0331137 | A1* | 10/2019 | Xiao | F04D 29/325 |
| 2020/0158357 | A1* | 5/2020 | Son | F04D 25/166 |
| 2022/0032222 | A1* | 2/2022 | Park | F24F 13/06 |

FOREIGN PATENT DOCUMENTS

| | | | |
|---|---|---|---|
| JP | 2003-139359 | A | 5/2003 |
| JP | 2008-249307 | A | 10/2008 |
| KR | 10-2018-0056988 | A | 5/2018 |
| KR | 10-1998780 | B1 | 7/2019 |
| KR | 10-2053227 | B1 | 12/2019 |

* cited by examiner

AIR CLEANER

TECHNICAL FIELD

The present invention relates to an air cleaner.

BACKGROUND ART

An air cleaner is understood as an apparatus that sucks and purifies contaminated air and then discharges the purified air. As an example, the air cleaner may include a blower for introducing external air into the air cleaner and a filter capable of filtering dust or bacteria in the air.

In general, the air cleaner sucks the external air through a suction port, purifies the sucked air through filters made of various materials provided inside the air cleaner, and then discharges the purified air through a discharge port.

A blower fan is provided inside the air cleaner to form the above-described airflow. Since the air cleaner has a limited capacity and it is limited to purify the entire air in an indoor space such as a home or office, there is a problem that it is difficult to purify the air in a space far from the air cleaner while the surrounding air of the air cleaner may be purified.

As described above, various studies are being conducted to widen a purification area of the air cleaner, and in general, in order to widen the purification area of the air cleaner, a high-speed fan motor is used, the suction port is formed on a lower side of the air cleaner, and the discharge port is formed on an upper side of the air cleaner.

In the case of a high-speed fan motor, since more heat is generated than a general fan motor according to the driving of the motor, the high-speed fan motor needs a structure for heat generation, and is generally a structure in which the discharge port side and the motor communicate with each other to discharge the heat. This is because a space in which the fan rotates needs to ensure a pressure difference in order to form a rapid airflow of air, thereby increasing a sealing rate.

However, as described above, in the case of the air cleaner employing an upper discharging structure, foreign substances are introduced along a direction of gravity and accumulated in the fan motor, thereby causing deterioration in a performance of the fan motor. In particular, when a fluid is introduced through the discharge port, a problem such as a short circuit may occur.

DISCLOSURE

Technical Problem

Accordingly, an object of the present invention is to solve the above-described problems.

One of the various objects of the present invention is to provide an air cleaner capable of preventing foreign substances from accumulating in a fan motor by guiding the foreign substances introduced through a discharge port of the air cleaner.

One of the various objects of the present invention is to provide an air cleaner in which a guide portion is formed in a shroud of an air purifier and introduced foreign substances may move along a direction of gravity through the guide portion.

Technical Solution

According to an exemplary embodiment of the present invention, an air cleaner includes: a case forming an exterior; a suction portion formed on at least a portion of an outer surface of the case to suck external air; a discharge portion formed on an upper surface of the case to discharge the air sucked through the suction portion; and a fan module provided in the case to form a flow of air flowing from the suction portion to the discharge portion, wherein the fan module includes: a fan motor forming a rotation shaft and generating a driving force; a blower fan receiving the driving force from the fan motor to rotate about the rotation shaft and forming the flow of air; and a housing forming a space accommodating the fan motor and he blower fan, and the housing is fixed between the suction portion and the discharge portion in the case and includes a guide portion guiding foreign substances introduced through the suction portion along a direction of gravity on an inner surface thereof.

The case may include a first body having the suction portion formed on an outer surface thereof and forming a space accommodating a filter for purifying the air and a second body having the discharge portion formed on an outer surface thereof and forming a space accommodating the fan module, and the first body and the second body may be detachably provided.

The housing may be fixed to an interface between the second body and the first body, and the housing may guide the foreign substances introduced through the suction portion to the second body by the guide portion.

According to another exemplary embodiment of the present invention, an air cleaner includes: a body forming an exterior; a suction portion formed on the body to suck air; a discharge portion formed on the body and discharging the air sucked through the suction portion; and a fan module provided in the body to form a flow of air flowing from the suction portion to the discharge portion, wherein the fan module includes: a driving portion forming a rotation shaft and generating driving force; a fan receiving the driving force from the driving portion and rotating about the rotation shaft; and a shroud accommodating the fan and provided between the suction portion and the discharge portion to guide the air sucked through the suction portion to the discharge portion, and the shroud includes a guide portion guiding foreign substances introduced through the discharge portion in a direction opposite to the flow of air.

The body may include: a first body having the discharge portion formed on one surface thereof and forming a space for accommodating the fan module; and a second body having the suction portion formed therein and detachably provided with the first body.

The suction portion may be formed along a circumference of the second body and the second body may include a filter provided along an inner circumference of the second body to be spaced apart from the suction portion by a predetermined interval.

The shroud may be provided so that a cross section thereof is widened along a movement direction of the air introduced into the suction portion and the guide portion may form an inlet port formed at an end portion of the shroud to guide the air introduced into the suction portion toward the first body.

The guide portion may include: a first member formed at an end portion of the shroud and curved in an inner direction of the first body; and a second member extending from the first member toward the inner direction of the first body. The second member may be provided to be inclined along the movement direction of the air introduced into the suction portion.

The guide portion may further include a third member extending from the second member toward the second body and the third member may form an inlet port guiding the air introduced into the suction portion toward the first body.

Each of the features of the above-described exemplary embodiments may be implemented in combination in other exemplary embodiments unless contradictory or exclusive with other exemplary embodiments.

Advantageous Effects

According to various exemplary embodiments of the present invention, the durability of the fan motor may be improved, and the safety accident that may occur due to the short circuit inside the fan motor may be prevented in advance.

According to various exemplary embodiments of the present invention, even if a user accidentally drops a fluid such as water, beverage, or the like into the suction port of the air cleaner, it is possible to prevent failure of the air cleaner by guiding the fluid to the lower portion of the air cleaner.

The effects of the present invention are not limited to those described above, and other effects not mentioned will be clearly recognized by those skilled in the art from the following description.

MODE FOR INVENTION

Hereinafter, exemplary embodiments of the present invention will be described with reference to the accompanying drawings. The following detailed description is provided to aid in a comprehensive understanding of the method, apparatus, and/or system described herein. However, this is only an example and the present invention is not limited thereto.

In describing the exemplary embodiments of the present invention, when it is determined that a detailed description of known technologies related to the present invention may unnecessarily obscure the subject matter of the present invention, a detailed description thereof will be omitted. In addition, terms to be described later are terms defined in consideration of functions in the present invention, which may vary according to the user, the intention of an operator, or the custom. Therefore, the terms should be defined on the basis of the contents throughout the present specification. The terms used in the detailed description are only for describing the exemplary embodiments of the present invention, and should not be limiting. Unless explicitly used otherwise, expressions in the singular form include the meaning of the plural form. In the present description, expressions such as "comprising" or "including" are intended to refer to certain features, numbers, steps, actions, elements, some or a combination thereof, and should not be construed to exclude the presence or possibility of one or more other features, numbers, steps, actions, elements, some or combination thereof other than those described.

In addition, in describing components of exemplary embodiments of the present invention, terms first, second, A, B, (a), (b), and the like, may be used. These terms are only for distinguishing the component from other components, and the nature, order, or sequence of the component is not limited by the term.

Figure 1:
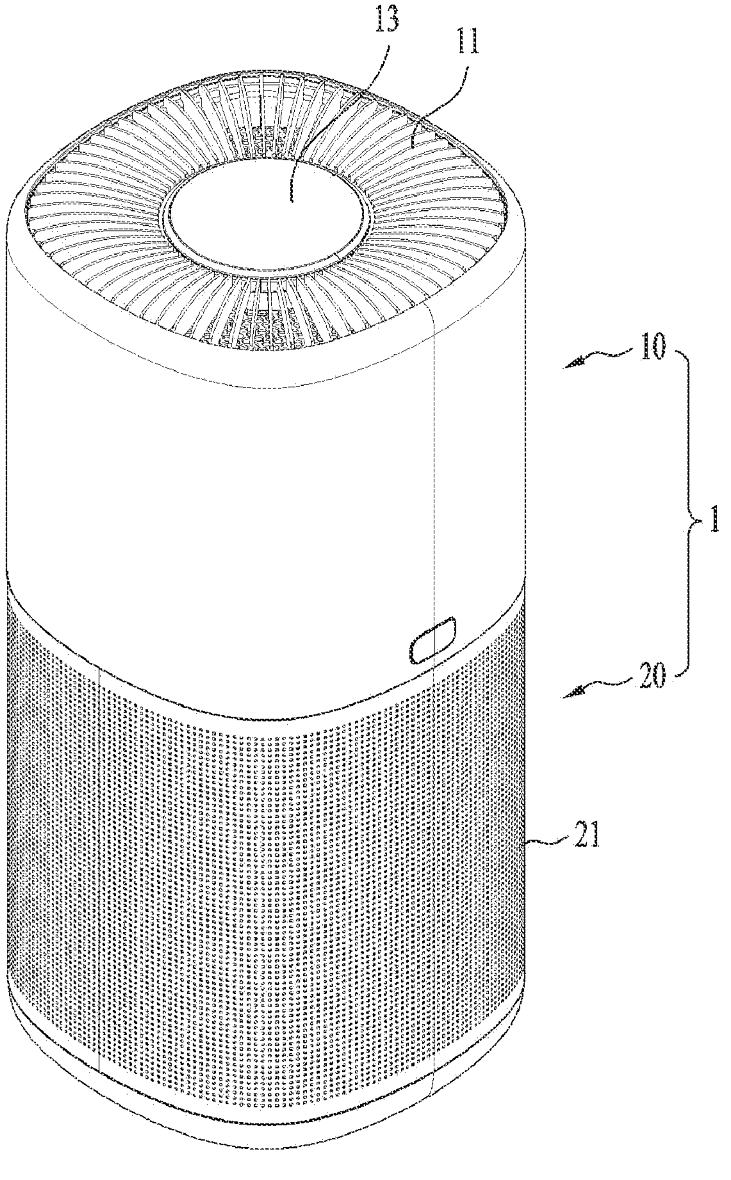
FIG. 1 is a view illustrating an exterior of an air cleaner according to an exemplary embodiment of the present invention.
Figure 2:
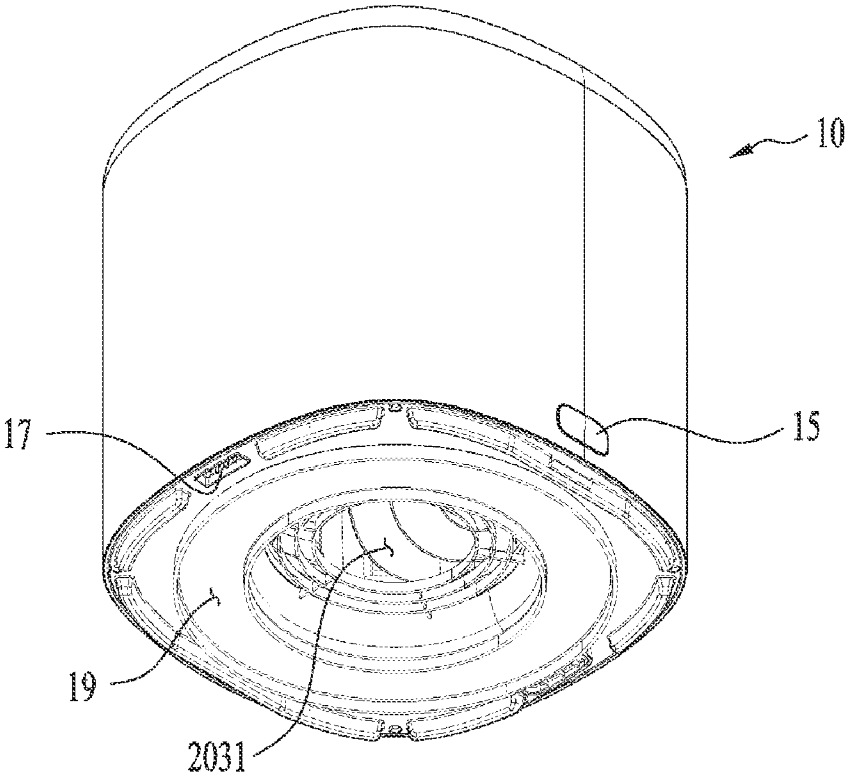
FIG. 2 is a view illustrating a first body of FIG. 1.

FIG. 1 is a view illustrating an appearance of an air cleaner according to an exemplary embodiment of the present invention and FIG. 2 is a view illustrating a first body of FIG. 1.

The description will be made with reference to FIGS. 1 and 2.

An air cleaner 1 according to an exemplary embodiment of the present invention may include bodies 10 and 20 forming an exterior, a suction portion 21, a discharge portion 11, and a fan module.

The first body 10 has the discharge portion 11 formed on one surface thereof, and has a space for accommodating the fan module formed therein. The air cleaner 1 of the present exemplary embodiment may be formed by coupling the first body 10 located at a relatively upper side and the second body 20 located at a relatively lower side. The first body 10 and the second body 20 may be detachably provided.

Meanwhile, the bodies 10 and 20 may be provided in various forms. As an example, the bodies 10 and 20 may be provided in a shape having a rectangular cross section or may also be provided in a cylindrical shape. In addition, the suction portion 21 and the discharge portion 11 may be formed in various positions in communication with the insides of the bodies 10 and 20.

The discharge portion 11 of the air cleaner 1 of the present exemplary embodiment is formed on an upper surface of the body, and the suction portion 21 is formed on a lower side of the body. This is because it is preferable that a discharge port is formed on an upper side of the air cleaner in order to widen a diffusion area of discharged air while discharging purified air to a user's real life space. Therefore, the suction port of the exemplary embodiment is provided on an upper surface of the air cleaner. In more detail, the discharge portion 11 may be provided on the upper surface of the first body 10, and the suction portion 21 may be formed along a circumference of the second body 20.

That is, the suction portion 21 may form a part of the upper surface of the air cleaner. A display portion 13 may be provided on the remaining part of the upper surface of the air cleaner.

The display portion 13 may display an air quality (based on a PM value) of an indoor space in which the air cleaner is currently provided. The display portion 13 may display various information such as a time, an air cleaning mode input to the air cleaner, and an operating time of the air cleaner. In addition, the user may control the above-described elements through the display portion 13.

As described above, when the display portion 13 is provided on the part of the upper surface of the air cleaner, the display portion 13 may be formed in a central portion of the upper surface of the air cleaner, and the discharge portion may be formed on the remaining area of the upper surface of the air cleaner along a circumference of the display portion 13. This is because the amount of air that is purified and discharged can be increased only when an area of the discharge portion 11 is made as wide as possible.

Therefore, as described above, the entire upper surface of the air cleaner may be provided as the discharge portion 11, and the above-described display portion 13 may also be formed on a part of a side surface of the air cleaner.

The suction portion 21 is a portion through which external air is introduced. The suction portion 21 is preferably formed in a large area to increase the amount of sucked air. The suction portion 21 of the exemplary embodiment may be formed along a lower circumferential surface of the air cleaner.

Therefore, the air cleaner of the present exemplary embodiment is an air cleaner having an upper discharge structure that sucks external air from a lower portion, purifies the sucked air inside the air cleaner, and then discharges the purified air from the upper portion of the air cleaner.

Meanwhile, the first body 10 and the second body 20 may be detachably provided. Therefore, a coupling portion 17 is provided below the first body 10 so that the first body 10 may be fitted with the second body 20. In addition, a button 15 may be provided on the first body 10 to easily couple and separate the first body 10 and the second body 20. As an example, the user may release the coupling of the first body 10 and the second body 20 by pressing the button 15 and then separate the first body 10 from the second body 20.

A through portion 2031 may be formed inside the lower portion of the first body 10. The through portion 2031 may form a part of a flow path through which the external air introduced into the suction portion 21 of the second body 20 moves to the first body 10. That is, the first body 10 and the second body 20 may communicate with each other through the through portion 2031.

In addition, a contact surface 19 contacting the upper surface of the second body 20 may be formed on the lower surface of the first body 10. The contact surface 19 may be formed around the through portion 2031 to maintain the rigidity of the first body 10 when the first body 10 is coupled to or separated from the second body 20.

Figure 3:
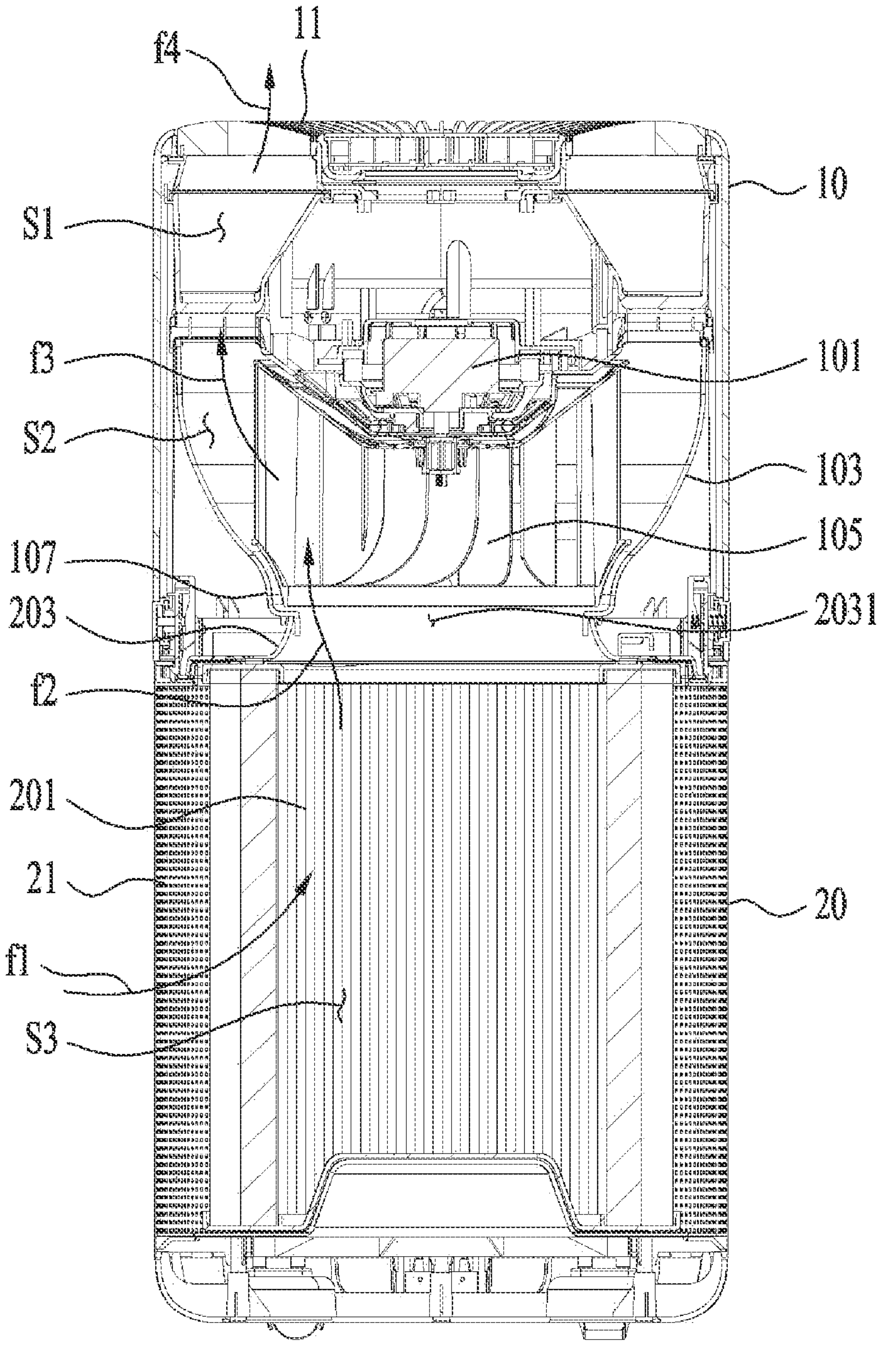
FIG. 3 is a side cross-sectional view of FIG. 1.
Figure 4:
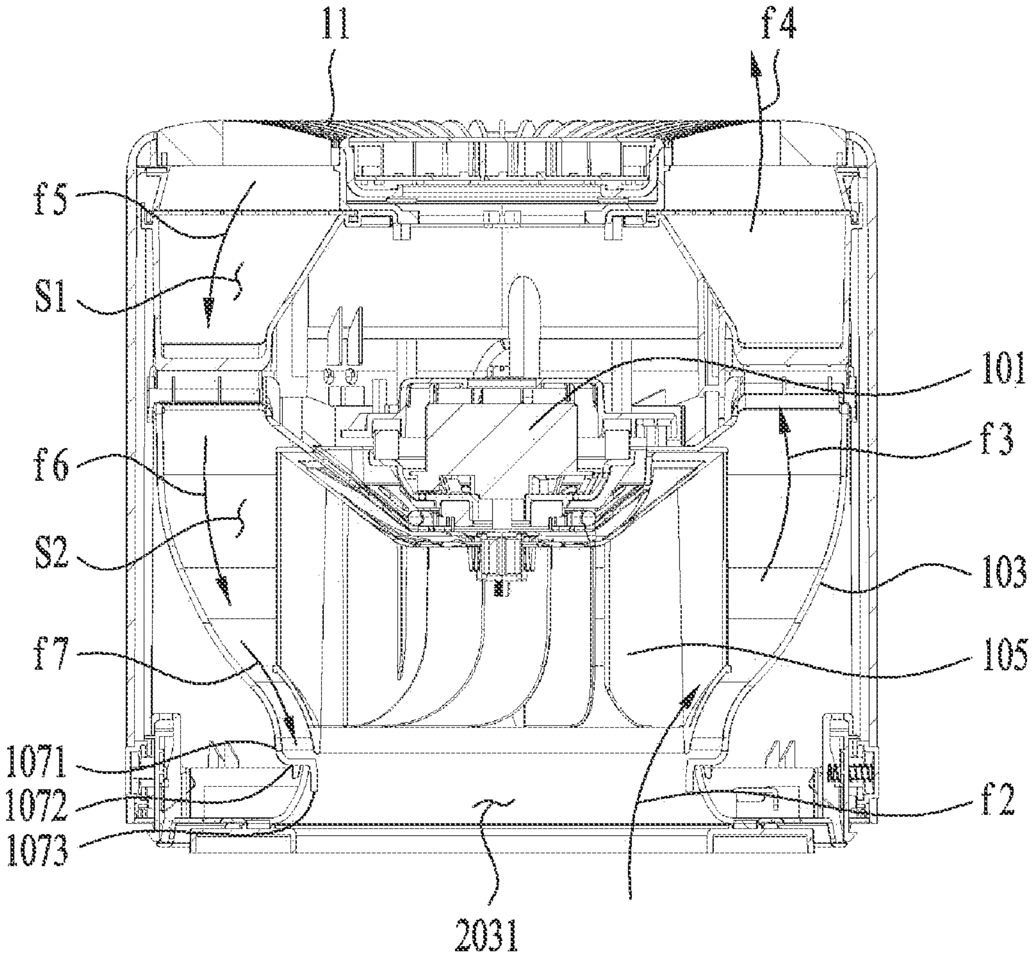
FIG. 4 is a side cross-sectional view of the first body of FIG. 3.

FIG. 3 is a side cross-sectional view of FIG. 1 and FIG. 4 is a side cross-sectional view of FIG. 3.

The description will be made with reference to FIGS. 3 and 4.

A fan module may be provided inside the first body 10 to form a flow of air flowing from the suction portion 21 to the discharge portion 11.

The fan module may include a driving portion 101 that forms a rotation shaft and generates a driving force, a fan 105 that receives the driving force from the driving portion 101 to rotate about the rotation shaft and forms the flow of air, and a shroud 103 that forms a space accommodating the driving portion 101 and the fan 105 and is provided between the suction portion 21 and the discharge portion 11 to guide the air sucked through the suction portion 21 to the discharge portion 11.

The fan 105 may include a hub coupled to the rotation shaft of the driving portion 101 and a plurality of blades extending radially from the hub. In addition, a fan suction port corresponding to the through portion 2031 may be formed in the shroud 103.

The hub may include a coupling hole into which a rotation shaft of a blower motor is inserted, and a guide portion extending in a radial direction from the coupling hole to change a movement path of the air sucked through the suction port.

That is, the external air introduced from the suction portion 21 may move from the lower portion of the air cleaner to the upper portion thereof along a longitudinal direction of the air cleaner 1, may be spread radially by the fan module, and may be moved to the discharge portion 11. Therefore, as an example of the exemplary embodiment, the fan 105 may be a diagonal flow type fan.

In the case of describing the flow of air in more detail, the air may move from the lower portion of the air cleaner to the upper portion thereof in a direction parallel to the rotation shaft of the motor through the fan suction port, and the movement path may be changed in a lateral direction of the motor through the guide portion. Therefore, the guide portion may be provided in a conical shape in which the upper and lower portions are penetrated, and since the rotation shaft of the motor may be inserted into the penetrating portion of the guide portion, the penetrating portion of the guide portion may be defined as the coupling hole.

The air cleaner 1 of the present exemplary embodiment has a structure in which the external air is sucked from the lower portion and discharged to the upper portion side, as described above. Therefore, the suction portion 21 may be formed along the circumference of the second body 20, and a filter 201 may be provided inside the second body 20 along an inner circumference of the second body 20 by being spaced apart from the suction portion 21 by a predetermined interval. Therefore, the filter 201 may be provided in a cylindrical shape.

Meanwhile, the first body 10 and the second body 20 may be detachably provided. In addition, the second body 20 may be provided to be compatible with the first body 10. It is effective that the amount of sucked external air is set differently depending on a size of a space where the air cleaner is installed. It is possible to control the suction amount of the air cleaner by software, but it is also possible to control a physical suction amount of the air cleaner by hardware. Therefore, the air cleaner is provided with an upper body and a lower body according to a relative height difference, and may be configured by combining two detachable bodies, and in particular, the second body 20 may be provided to be compatible with the first body 10.

The second body 20 is implemented in the form of a housing having an opened upper portion and an empty space therein. The housing of the second body 20 is provided in a cylindrical shape in the present exemplary embodiment. In addition, the filter 201 may be detachably provided in the empty space inside the second body 20.

In the present exemplary embodiment, the suction portion 21 for sucking external contaminated air may provided on an outer circumferential surface of the second body 20, and the suction portion 21 may be provided on a front surface of the second body 20 at 360 degrees along the outer circumferential surface of the second body 20 so as to suck the external contaminated air in all directions. Accordingly, the air cleaner may suck the external contaminated air from all directions without being restricted by the installation environment.

The suction portion 21 may be provided by arranging a plurality of inlet holes or inlet slits having a predetermined size formed to penetrate so that the contaminated air is introduced.

One or more coupling grooves may be formed in at least a portion of a circumference of the opened upper portion of the second body 20. The coupling groove is provided for a firm coupling structure with the filter 201, and the filter 201 may be fixed to the inside of the second body 20 through the coupling groove. The filter 201 may be separated from the coupling groove as needed. That is, the filter 201 may be detachably provided inside the second body 20.

The filter 201 may be provided in a cylindrical shape corresponding to that the suction portion 21 is provided on the front surface of the second body 20 at 360 degrees along the outer circumferential surface of the second body 20. That is, the filter 201 may perform a filter function in all directions of 360 degrees along the outside.

A label-shaped separating member may be provided on an upper circumference of the filter 201 so that the user may lift and separate the filter 201 from the second body 20. One side of the separating member may be coupled to the opened upper circumference of the second body 20, and the other side of the separating member may have a shape protruding toward an opened direction from the upper portion of the second body 20. Accordingly, a part of the separating member may be exposed to the outside in a state in which the filter 201 is inserted into the lower body.

The separating member is preferably provided in a plurality of pairs on an opened upper circumference of the lower body to face each other.

With such a structure, when the filter 201 inserted in the empty space of the second body 20 is to be separated from the second body 20 for reason of replacement or cleaning, the separation may be performed by holding and lifting the separating member exposed to the outside.

The second body 20 may be implemented and compatible in different sizes. In addition, the first body 10 may be coupled to the second body 20 without being restricted by the size to be implemented. Accordingly, the first body 10 may be used compatibly with the second body 20 having different capacities.

That is, the user may effectively purify the air in a target space by coupling the second body 20 of the air cleaner to the first body 10 according to the size and environment of the space in which air is to be purified.

In addition, the number of rotations of the fan of the air purifier may be automatically set according to an air purification capacity of the second body 20. This is because, as the air purification capacity of the second body 20 increases, an air purification range of the air cleaner becomes wider, and therefore, it is preferable to increase the number of rotations of the fan.

As an example of the automatic setting of the number of rotations of the fan, there is a method in which the capacity of the second body 20 controls the fan module provided inside the first body 10 through a contact portion according to a unique value input to the second body 20 provided to be interchangeable.

The first body 10 has an opened upper portion, and the opened space may mean the discharge portion 11 of the present exemplary embodiment. The lower portion of the first body 10 may be coupled to the opened upper portion of the second body 20. In more detail, the lower opened space of the shroud 103 provided in the first body 10 and an opened space formed by a penetrating member 203 extending toward the first body 10 on the upper surface of the second body 20 may communicate with each other. That is, the through part 2031 may form a part of a flow path through which the external air introduced from the second body 20 moves by the first body 10 and the second body 20 being communicated with each other.

Meanwhile, the first body 10 and the second body 20 may be coupled to each other by having magnetic bodies implemented to have different magnetisms on the circumferential surfaces that contact each other.

Therefore, it is preferable that the upper circumference of the second body 20 and the lower circumference of the first body 10 correspond to each other.

A plurality of wheels for easy movement of the air cleaner may be provided under the second body 20. The rotation of the wheel is fixed according to the user's manipulation, so that the position of the air cleaner may be easily fixed.

A contact portion, which is a portion that contacts to be coupled to the first body 10, may be provided on the upper circumferential surface of the second body 20. Accordingly, the first body 10 and the second body 20 of the air cleaner may be more firmly coupled.

Power supplied to the second body 20 through the contact portion may be supplied to the first body 10. The first body 10 may also be directly supplied with the power from the outside.

Meanwhile, the shroud 103 may be provided between the suction portion 21 and the discharge portion 11 in the air cleaner 1, and may include a guide portion 107 that guides foreign substances introduced through the discharge portion 11 along the direction of gravity on the inner surface thereof.

The shroud 103 is provided at a relatively upper side of the air cleaner 1 than the suction portion 21, and is provided at a relatively lower side than the discharge portion 11. That is, the shroud 103 guides the external air introduced into the suction portion 21 to the discharge portion 11.

Since the discharge portion 11 of the present exemplary embodiment is provided along the circumference of the display portion 13 on the upper surface of the first body 10, the shroud 103 is preferably provided in a shape whose cross section is widened along the movement direction of the air introduced into the suction portion 21. Therefore, the inner circumferential surface of the shroud 103 may be curved as the shroud 103 is provided in the shape whose cross section is widened along the movement direction of the air as described above.

That is, the shroud 103 may be provided in a shape with a cross-sectional area widening along the movement direction of the air, and in such a shape, a lower circumference of the shroud 103 may be formed smaller than an upper circumference of the shroud 103.

A space in which the blade rotates is formed in the shroud 103, and as described above, as the blade rotates, the movement path of the airflow moving from the lower portion of the air cleaner to the upper portion thereof is changed to form the airflow moving from an outer circumference of the blade to the upper portion.

In more detail, the driving portion 101 of the fan module may be located at a central portion of the shroud 103, and the outer circumference of the fan 105 may be formed smaller than the lower circumference of the shroud 103. In addition, since the shroud 103 may be provided in a shape in which the cross-sectional area increases from the lower portion to the upper portion, the shroud 103 may radially guide the airflow that moves straight from the lower portion to the upper portion according to the rotation of the fan 105.

The radially guided air is discharged to a space close to the upper outer circumference of the shroud 103. This is because, as described above, the driving portion 101 that forms the rotation shaft and transmits the power is provided at the central portion of the shroud 103, so that the air may not be discharged through the central portion of the shroud 103.

Such a structure is also related to the structures of the display 13 and the discharge portion 11 of the first body 10 described above. As described above, even if the front surface of the first body 10 is provided as a discharge port, the air may not be discharged through the upper front surface of the first body 10 in the structure of the shroud and fan motor. To discharge the air through the upper front surface of the first body 10, since a separate flow path is formed to guide the airflow to the upper portion of the driving portion 101, that is, the central portion of the shroud 103, resistance of the airflow is increased in such a structure, so that the discharged amount of the purified air may be reduced.

Therefore, the display may be provided at the central portion of the upper surface of the first body 10, and it is preferable that the air is discharged from a space between the outer circumference of the first body 10 and the outer circumference of the display at the center portion.

Meanwhile, an end portion of the shroud 103 according to the present exemplary embodiment may be located at a boundary between the second body 20 and the first body 10. Since it is preferable that the second body has all of the circumferential surfaces formed as the suction portion 21 to increase the suction amount of the air cleaner and it is preferable that the fan module is located as close as possible to the suction portion 21 to increase a suction force, the shroud 103 may be fixed to an upper end surface of the second body 20.

It is preferable that a circumference of the upper end surface of the second body 20 is provided to correspond to a circumference of a lower end surface of the first body 10. This is because when the first body 10 and the second body 20 are coupled, it is possible to prevent a step from occurring on the outer surface of the air cleaner, and the first body 10 and the second body 20 are coupled to each other to increase the sealing rate inside the air cleaner to further generate a pressure difference.

In addition, the filter 201 provided inside the second body 20 may be provided in a hollow shape, and it is preferable that the lower circumference of the shroud 103 is provided to correspond to the circumference of the filter 201. This is because increasing the sealing ratio of the inner space of the first body 10 and the second body 20 may cause a greater pressure difference because an inlet through which the purified air that has passed through the inner spaces of the second body 20 is introduced is formed under the shroud 103, and the suction force increases as the pressure difference increases.

The second body 20 may have the suction portion 21 formed along the outer circumferential surface thereof and the cylindrical filter 201 provided therein. An outer circumferential surface of the cylindrical filter 201 may be provided to be apart from the suction portion 21 by a predetermined interval.

If the outer circumferential surface of the filter 201 is in contact with or is located very close to the suction portion 21, it may be difficult to generate a sufficient suction force, and if the outer circumferential surface of the filter 201 is in close contact with the suction portion 21, the user may not easily replace the filter inside the first body 10 after separating the first body 10 from the second body 20.

Summarizing the above, the lower circumference of the shroud 103 of the present exemplary embodiment is an inlet through which purified air is introduced, and it is preferable that the lower circumference of the shroud 103 is formed to correspond to the circumference of the cylindrical filter 201 located inside the second body 20.

The movement path of the air through the air cleaner 1 having the above-described structure will be described, and a flow f1 in which external air is introduced through the suction portion 21 is generated by driving the fan module. The introduced external air is introduced through the suction portion 21 and then purified through the filter 201.

In addition, the purified air passes through the through portion 2031 and moves (f2) from the second body 20 to the first body 10. In addition, the air purified in the inside of the first body 10 is moved (f3) toward the discharge portion 11 along the curved inner circumferential surface of the shroud 103, and is discharged (f4) to the outside through the discharge portion 11.

On the other hand, in homes with infants and toddlers, a variety of foreign substances often flow into the fan of the air cleaner. In this case, the foreign substances may be removed only after the air cleaner is completely disassembled because the inside of the fan is covered with the foreign substances or discharging of the foreign substances from the inside to the outside is essentially impossible.

In addition, even when liquids such as water and juice are added, the liquids are collected inside the air cleaner, which makes it difficult to discharge the liquids, and as a result, there is a problem of having to obtain an after sales service (AS) from a manufacturer or distributor, and there is a difficulty in that a higher cost than the actual cost is incurred even by the manufacturer or distributor.

The present invention aims to remove the foreign substances without affecting the function and performance of the air cleaner through a structure in which the foreign substances or liquids flow down by gravity immediately when the foreign substances or liquids are injected.

Therefore, the present invention is to provide a blower fan having a design that does not trap foreign substances and liquids, and a blower fan case configured to allow the foreign substances and the liquids to go directly down by gravity when the foreign substances and the liquids are injected, in the air cleaner with the air discharge port facing the upper portion as in the present exemplary embodiment.

The present exemplary embodiment discloses a structure in which, when foreign substances are introduced into an air outlet port of the upper portion of the air cleaner, the introduced foreign substances are not trapped by an internal blower fan, and all the foreign substances flow down to the lower filter portion without being trapped by the case in which the blower fan is accommodated.

In addition, as described above, the upper and lower portions of the air cleaner are provided to be separated. Therefore, when the foreign substances are injected into the air cleaner, the user may remove the foreign substances by separating the air cleaner.

The present invention discloses a structure in which foreign substances and liquids may flow down by gravity without being trapped even when the upper portion of the separated air cleaner is turned over.

Referring to FIG. 4, in the structure of the air cleaner in which the discharge portion 11 is formed at the upper portion and the suction portion 21 is formed at the lower portion as in the present exemplary embodiment, the foreign substances are introduced through the discharge portion 11 and are moved along a direction of gravity toward the fan module (f5).

In addition, the introduced foreign substances may be moved along the inner circumferential surface of the shroud 103. In the fan having the structure as in the present exemplary embodiment, since the airflow is formed in a radial direction toward the outer side in the radial direction of the rotation shaft, the foreign substances are moved along the inner circumferential surface of the shroud 103 (f6).

The foreign substances moving along the inner circumferential surface of the shroud 103 is moved (f7) through a gap between the fan 105 and the lower side of the shroud 103, and is guided toward the second body 20 by the guide portion 107.

Therefore, in the structure of the air cleaner of the present exemplary embodiment, it is possible to prevent the foreign substances from accumulating in the fan module, and as described above, even if the foreign substances are introduced into the air cleaner through the discharge portion 11, the user may easily remove the foreign substances accumulated in the second body 20 after separating the first body 10 from the second body 20.

In addition, the air cleaner has a structure with a blower fan, a circuit, a sensor, and a control unit in the upper portion thereof and a filter in the lower portion thereof. In this case, external power is connected through the lower portion or the upper portion, and electrical connection between the lower portion and the upper portion may be made by the above-described contact portion.

Therefore, there is disclosed that the shroud 103 of the present exemplary embodiment is provided between the suction portion 21 and the discharge portion 11 in the air cleaner, and includes the guide portion 107 that guides the foreign substances introduced through the discharge portion 11 along the direction of gravity.

In general, the shroud needs to have a certain shrinkage ratio or more to prevent deformation of the shroud during injection molding, and in order to increase the sealing rate of a place where the fan motor rotates to generate a pressure difference, a protruding member protruding from the lower portion of the shroud toward the upper portion thereof is formed on the lower circumference of the shroud.

In addition, the housing is fixed inside the air cleaner using the thickness and shape of the protruding member. In the above-described structure, the protruding member forms a portion where the foreign substances introduced through the discharge portion are trapped and accumulated.

Therefore, in the present exemplary embodiment, since the guide portion 107 is formed under the shroud 103, a problem that the foreign substances introduced through the discharge portion 11 are trapped and accumulated may occur, and by moving the foreign substances introduced through the discharge portion 11 to the second body 20, the user may easily remove the introduced foreign substances by cleaning the second body 20.

As described above, since the air cleaner of the present exemplary embodiment has the fan module, the display, the circuit board, and the like built in the first body 10, it is not easy to remove the foreign substances when the foreign substances are accumulated inside the first body 10 and there is a risk of damage to electronic products by the accumulated foreign substances.

Therefore, the foreign substances are guided to the space in which the internal filter 201 of the second body 20 is accommodated. In addition, the foreign substances guided to the space in which the filter 201 is accommodated may be easily removed while the user replaces the filter 201.

It is preferable that the guide portion 107 of the present exemplary embodiment forms a predetermined inclination along the direction of gravity, and the circumference formed by the end portion of the guide portion 107 corresponds to the circumference of the filter 201.

The guide portion 107 may form the predetermined inclination to guide the foreign substances introduced through the discharge portion 11 in a direction opposite to the flow of air flowing inside the air cleaner.

In more detail, the guide portion 107 may include a first member 1071 formed at the end portion of the shroud 103 and curved in the inner direction of the first body 10 and a second member 1072 extending from the first member 1071 toward the inner direction of the first body 10.

The second member 1072 may extend by a predetermined length in the inner direction of the first body 10 to ensure the shrinkage rate and the sealing rate in the fan module during the injection molding of the shroud 103, and may also use an area of the second member 1072 to form a fastening portion in which the shroud 103 is fixed to the upper portion of the second body 20 or the lower portion of the first body 10.

The length in which the second member 1072 extends may be reduced, and the thickness of the second member 1072 in a height direction may be increased to reinforce the rigidity. This is because the foreign substances may be prevented from being guided toward the second body 20 by the length of the second member 1072 extending in the inner direction of the first body 10.

Therefore, the second member 1072 protrudes toward the inner side in the radial direction of the lower circumference of the shroud 103, and may form a predetermined inclination angle like the first member 1071.

In addition, the guide portion 107 may further include a third member 1073 extending from the second member 1072 toward the second body 20. In the above-described structure, since the shroud 103 and the guide portion 107 are integrally formed, a circumference formed by the third member 1073 may form an inlet port through which the air moving from the second body 20 toward the first body 10 is introduced.

In addition, as the third member 1073 is formed, it is possible to ensure the shrinkage rate of the shroud during injection molding of the shroud 103.

Although various exemplary embodiments of the present invention have been described in detail above, those of ordinary skill in the art to which the present invention pertains will understand that various modifications may be made to the above-described exemplary embodiments without departing from the scope of the present invention. Accordingly, the scope of the present invention is not construed as being limited to the described exemplary embodiments but should be determined not only by the claims to be described later, but also by those equivalents to the claims.

The invention claimed is:

1. An air cleaner comprising:
- a body forming an exterior;
- a suction portion formed on the body to suck air;
- a discharge portion formed on the body and discharging the air sucked through the suction portion; and
- a fan module provided in the body to form a flow of air flowing from the suction portion to the discharge portion, the fan module having:
  - a driving portion having a rotation shaft and generating power,
  - a fan receiving the power from the driving portion and rotating about the rotation shaft, and
  - a shroud accommodating the fan and provided between the suction portion and the discharge portion, and guiding the air sucked through the suction portion to the discharge portion, and the shroud having a guide portion, wherein the body includes:
- a first body having the discharge portion disposed on one surface thereof and having a space for accommodating the fan module; and
- a second body having the suction portion therein and configured to be detachably coupled to the first body, and wherein the guide portion has a slope extending from one end of the shroud and is configured to guide the foreign substances introduced from the discharge portion to the second body along the slope.

2. The air cleaner of claim 1, wherein the slope of the guide portion defines an open pathway structure directing the foreign substances to the second body without hindrance.

3. The air cleaner of claim 1, wherein the suction portion is formed along a circumference of the second body.

4. The air cleaner of claim 3, wherein the second body includes a filter provided along an inner circumference of the second body to be spaced apart from the suction portion by a predetermined interval.

5. The air cleaner of claim 1, wherein the shroud has a cross-sectional area that becomes larger as the cross-sectional area moves away from the suction portion toward the discharge portion.

6. The air cleaner of claim 5, wherein the guide portion defines an inlet port disposed at the one end of the shroud and guides the air introduced into the suction portion toward the first body.

7. The air cleaner of claim 5, wherein the guide portion includes:

a first member extending from the one end of the shroud and curved in an inner direction of the first body; and a second member extending from the first member toward the inner direction of the first body.

8. The air cleaner of claim 7, wherein the second member is provided to be inclined along the movement direction of the air introduced into the suction portion.

9. The air cleaner of claim 7, wherein the guide portion further includes a third member extending from the second member toward the second body.

10. The air cleaner of claim 9, wherein the third member forms an inlet port guiding the air introduced into the suction portion toward the first body.

* * * * *